W. D. STROUD.
Corn Sheller.
No. 63,671.
Patented April 9, 1867.
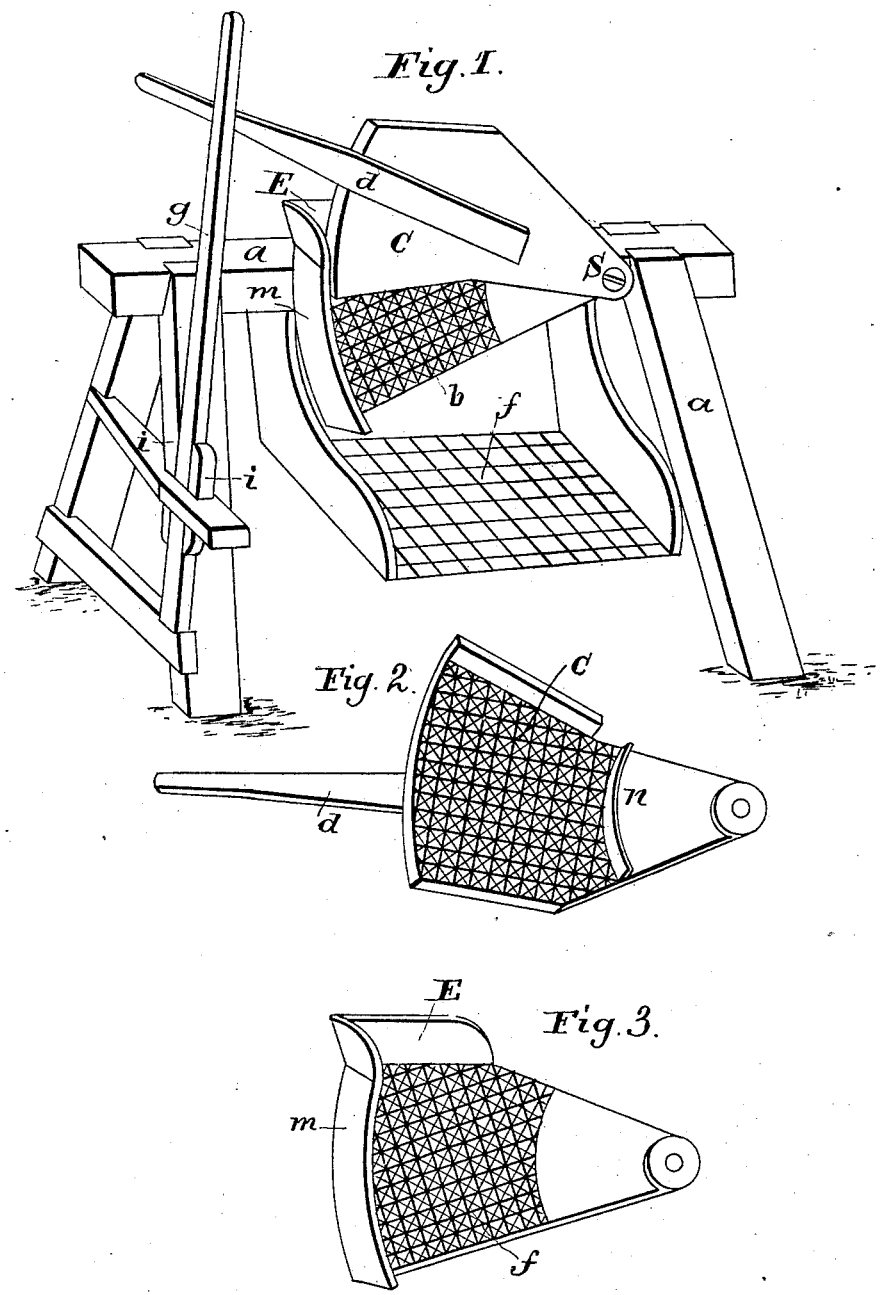
Witnesses:
W. G. Ritch
O. M. Ritch
Inventor:
W. D. Stroud

United States Patent Office.

WILLIAM D. STROUD, OF OSHKOSH, WISCONSIN.

Letters Patent No. 63,671, dated April 9, 1867.

---

IMPROVEMENT IN CORN-SHELLER.

---

The Schedule referred to in these Letters Patent and making part of the same.

---

TO ALL WHOM IT MAY CONCERN:

Be it known that I, WILLIAM D. STROUD, of the city of Oshkosh, county of Winnebago, State of Wisconsin, have invented a new and usefully improved Corn-Sheller; and I do hereby declare that the following is a full, clear, and exact description of the construction and operation of the same, reference being had to the annexed drawings, making a part of this specification, in which—

Figure 1 is a perspective view.

Figure 2 is a movable toothed plate, with lever $d$, and inside rim $n$, attached.

Figure 3 is a stationary toothed plate with hopper E and outside rim $m$ attached.

$a\ a$ is the frame, $d$ is a lever and handle attached to and operates the movable plate $c$. $g$ is an upright bearing or spring pole, and is fastened to the frame $a$, and adjusted by the wedges $i\ i$. $s$ is an adjustable screw passing through a spiral spring (not seen) into the frame $a$, and with the spring bearing $g$ secures the toothed plate $c$ in its relative position. E is a hopper attached to the upper side of plate $b$. $f$ is a screen. $n$ and $m$ are inside and outside rims, and keep the ear of corn between the toothed plates when being shelled. The teeth on the respective plates $c$ and $b$ are so set as to have a diagonal relation one to the other, enabling you to give the ear of corn a raking crush or roll, and thereby more efficiently and completely shelling the corn from the ear. The toothed plates $c$ and $b$ are of an irregular triangular form, and made of cast iron; the balance may be constructed of wood. The stationary plate $b$ is fastened lengthwise to the frame $a$, with the teeth out. The movable plate $c$, with the teeth in, and parallel to the plate $b$, is secured thereto, and to the frame $a$, by the adjustable screw $s$, and with the handle or lever $d$ thereto attached is operated up and down on the arc of a circle, with the fastening or screw $s$ as the centre. The plate $c$ adapts itself to the size of ears of corn by an ordinary spiral spring, as a bearing for the fastening or screw $s$ at one end, and at the opposite end by the lever $d$, forming a bearing on the spring pole $g$. The plate $c$ being raised, the ear of corn is thrown into the hopper E. As the corn is being shelled the ear is kept in position between the toothed plates by the rims $n$ and $m$. The plate $c$, through the lever $d$, is brought down and the corn is shelled, and from thence the corn and cob escape to the screen $f$, and the corn separated from the cob.

What I claim as my invention, and desire to secure by Letters Patent, is—

The movable plate $c$, and the stationary plate $b$, with the diagonal setting of the teeth thereon relatively one to the other, on the respective plates, the lever $d$, the inside rim $n$, the outside rim $m$, the hopper E, the adjustable screw $s$, the adjustable spring bearing $g$, and the screen $f$, when constructed and arranged relatively to themselves and to the frame $a\ a$ substantially as described for the purposes set forth.

W. D. STROUD.

Witnesses:
    W. G. RITCH,
    O. M. RITCH.